US009082095B2

(12) United States Patent
Duff

(10) Patent No.: US 9,082,095 B2
(45) Date of Patent: Jul. 14, 2015

(54) SYSTEM AND METHOD OF SUBMITTING DAILY FIELD REPORTS

(71) Applicant: Field Dailies LLC, Danville, KY (US)

(72) Inventor: James Raymond Duff, Cincinnati, OH (US)

(73) Assignee: Field Dailies LLC, Danville, KY (US)

( * ) Notice: Subject to any disclaimer, the term of this patent is extended or adjusted under 35 U.S.C. 154(b) by 0 days.

(21) Appl. No.: 14/270,735

(22) Filed: May 6, 2014

(65) Prior Publication Data

US 2014/0365256 A1 Dec. 11, 2014

Related U.S. Application Data

(60) Provisional application No. 61/833,690, filed on Jun. 11, 2013.

(51) Int. Cl.
*G06Q 10/00* (2012.01)
*G06Q 10/06* (2012.01)
*G06F 9/44* (2006.01)

(52) U.S. Cl.
CPC ...... *G06Q 10/063114* (2013.01); *G06F 9/4443* (2013.01)

(58) Field of Classification Search
CPC .............................. G06Q 10/063114
See application file for complete search history.

(56) References Cited

U.S. PATENT DOCUMENTS

| 2004/0143811 | A1* | 7/2004 | Kaelicke et al. | 717/101 |
| 2009/0174768 | A1* | 7/2009 | Blackburn et al. | 348/130 |
| 2011/0261186 | A1* | 10/2011 | Blackburn et al. | 348/92 |
| 2014/0129277 | A1* | 5/2014 | Lavrov et al. | 705/7.15 |

* cited by examiner

*Primary Examiner* — Christine Behncke
*Assistant Examiner* — Amanda Gurski
(74) *Attorney, Agent, or Firm* — Frost Brown Todd LLC

(57) ABSTRACT

A system provides field workers with on-site access to forms and tools that guide the field worker through the data entry and submission of information and images from field inspections and maintenance. The system also provides an interface for recipients of submitted field reports to view and manage the received data.

16 Claims, 20 Drawing Sheets

Internet Browser http://www.fielddailies.com

Site Graphics

Fields Dailies Forms:

Home > Daily-Forms

Thank you for being a field dailies subscriber.

- Tower Crew Field Daily (TCFD)
- Civil Crew Field Daily (CCFD)
- Construction Start Form (CTF) (to be filled out by the CM)
- Tiger Team Field Daily (TTFD)
- Material Request (MR)
- Equipment Request (ER)
- Daily Time Card (DTC)
- Monthly Time Card (MTC)
- Daily Expense Report (DER)
- Weekly Expense Report (WER)
- Monthly Expense Report (MER)
- Upload Photos & Other Files

News & Events

- May 22, 2013
  -CTIA 2013: Verizon Wireless partners with Ericsson, Alcatel Lucent on small cell plans
- May 21, 2013
  -Monopole fire takes crown pole out of service Demo Contact us directly to recieve OHSA NATE safety Audit and EIA TIA 22F Tower Inspection.
Email: email@email.com Phone: 555-555-5555 Address: 101 East Submatrix

FIG. 7

Tower Crew Field Daily:

Home > Daily Forms > TCFD

Name*

First    Last

Additional Crew Names*

Max: 500 words. Currently Used: 0 words

Company Name*

Email*

Additional Email #1

Additional Email #2

Market

News & Events

■ May 22, 2013
-CTIA 2013: Verizon Wireless partners with Ericsson, Alcatel Lucent on small cell plans
■ May 21, 2013
-Monopole fire takes crown pole out of service

FIG. 8

Daily File Upload:

Please select your company and you will be redirected to your respective upload page.

- ○ Blackhawk
- ○ Hernandez Electrical Construction and Communications
- ○ MAC Tower Service
- ○ MPI
- ○ Orin
- ○ Overland Conctracting
- ○ Paragon
- ○ Phoenix
- ○ SBA
- ○ Demo

[Submit]

Home > Daily File Upload

News & Events

- ■ May 22, 2013
  -CTIA 2013: Verizon Wireless partners with Ericsson, Alcatel Lucent on small cell plans
- ■ May 21, 2013
  -Monopole fire takes crown pole out of service Site Graphics

Internet Browser http://www.fielddailies.com

Home > Daily File Upload > FU Paragon

FU Paragon:

Welcom FU Paragon users, please use the form below to upload your files.

Files Cannot Exceed 2GB

Your Name*

Marker*

Customer Name:*

Site No.:*

Your Email Address*

File 1: Choose File  Field Report.pdf
File 2: Choose File  Site Pictures.pdf
File 3: Choose File  No File Chosen
File 4: Choose File  No File Chosen Upload Files

News & Events

- May 22, 2013
  -CTIA 2013: Verizon Wireless partners with Ericsson, Alcatel Lucent on small cell plans
- May 21, 2013
  -Monopole fire takes crown pole out of service

24 Hour Closeout Form

Site Name

BS Number

Picture of Site ID　　　　[ Choose File ] No file chosen

Administrative

Type oF Installation

Latitude

Longitude

Property Owner

Physical Address

Contac Person or Site Supervisor

Email

Drawings

Picture of Site Plan　　　[ Choose File ] No file chosen

Picture of Elevation Plan　[ Choose File ] No file chosen

Site Photographs

Pic 1　　　　　　　　　　[ Choose File ] No file chosen

Pic 2　　　　　　　　　　[ Choose File ] No file chosen

Pic 3　　　　　　　　　　[ Choose File ] No file chosen

FIG. 17A

Electrical

Model Number

Serial Number

Attach Certificate of Compliance     [Choose File] No file chosen

Attach Test Report     [Choose File] No file chosen

Earth Test Certificate

Conforms To

Required Resisitance

Resistance Achieved Average

Weather Conditions

Soil

Date Tested

Tested By

Witness By

Mast Structural Report

Pic of Mast Structuial Report     [Choose File] No file chosen

Approvals

Picture of Approvals     [Choose File] No file chosen

Serial Numbers

FIG. 17B

Region

Date Recieved

Part Number 1

Serial No#1

Description 1

Part Number 2

Serial No#2

Description 2

Sweeps

Sweep1    [ Choose File ] No file chosen

Sweep2    [ Choose File ] No file chosen

Sweep3    [ Choose File ] No file chosen

Submit

Back to Closeout Forms

SYSTEM AND METHOD OF SUBMITTING DAILY FIELD REPORTS

PRIORITY

This application claims priority to U.S. Provisional Patent Application Ser. No. 61/833,690, filed Jun. 11, 2013, entitled "System and Method of Submitting Daily Field Reports," the disclosure of which is incorporated by reference in its entirety herein.

FIELD

The present technology relates generally to regular field reports which are commonly submitted in the telecom, construction, and mechanical industries and can be used to implement systems and methods that enable quick and easy submission of reports to project managers.

BACKGROUND

In the modern world there are many different incredibly large infrastructures that span across nations, and sometimes even across continents. The United States in particular has some of the largest infrastructures in the world. These infrastructures serve many different purposes that are crucial to modern life, such as communications, transportation, power distribution, clean water distribution, and waste disposal. These infrastructures make much of modern life possible. For example cities would be nearly impossible to maintain without proper transportation and waste disposal networks. Waste disposal is of particular importance. In the past, waste in cities was simply dumped out into the streets; trash, detritus, and even human waste collected on the streets, creating a potent hazard to public health. In the modern world, waste disposal infrastructure ensures that trash and human wastes are properly handled and disposed of such that they do not collect in public spaces.

Transportation infrastructures in the United States allow citizens to cover distances that would otherwise take hours or even days by foot. The vast and winding road network present in the United States allows citizens to travel by motor vehicle with great speed. This enables for rapid distribution of goods by private companies, vacation travel by private citizens, and disaster response by the military and the government.

The communications infrastructure in the United States is also highly important, allowing people to transmit ideas and instructions from one side of the country to the other nearly instantaneously. Radio towers dot the country, covering it in a vast net of wireless communications coverage. This enables people to communicate with one another even when they do not have access to a landline communications device. Devices known as cell phone have become the most prevalent and dominant form of communication in the country; some people do not even maintain a landline telephone anymore, as a cell phone can fulfill all of their communication needs. One of the reason cell phones are so dominant in the modern world is because they are capable not only of accessing radio tower networks for voice communication, but also of connecting to the internet via radio towers. The internet allows for near instantaneous transmission of information, the applications of which are far too numerous to list here, however perhaps the most common use of the internet is to allow users to access what are known as websites to obtain information about certain topics or carry out certain functions such as purchasing an item. Because of these advantages, the value of the different infrastructures found in the United States is very apparent, and modern life would simply not be the same without them.

All infrastructures, no matter how advanced, must be maintained and sometimes expanded through the constant hard work of trained employees. These trained employees are responsible for travelling to locations where physical components of the infrastructure are present and performing preventative maintenance or repairs on those physical locations. As a result of this fact, these employees are sometime referred to as field workers. For example, a field worker for a telecommunications company may be required to travel to a damaged cell tower and affect repairs. As most of these infrastructures are used by a vast number of people, they are of great importance, and all work performed on infrastructure elements must be held up to certain standards. These standards may be set by the company that owns that element of the infrastructure, or they may be set by the government to ensure safety of citizens utilizing the infrastructure. As a result of this fact, field workers are often required to submit what is known as a field report or field daily. These field reports document that the work has been completed, and that the work has been completed to the required industry standards.

Currently, field daily reports are often submitted via email. The field worker completes all necessary forms and prepares all necessary files and then emails all of those forms and files to the intended recipient, which is typically the company which owns the infrastructure element that was worked on. This method does accomplish the desired goal of delivering the field daily report and required files to the intended recipient, however it is rather inefficient. One reason for this inefficiency is the fact that often times the digital size of the files exceeds the maximum amount that can be sent in one email. This requires the field worker to compose and send multiple different emails just to close out one field task that they performed. Furthermore, email clients can be insufficient to properly organize the field daily report and its required files. This means that should the company wishes to revisit those files, it can be difficult to find them amid the mass of emails that were received on that particular date. The process of submitting field reports and files by email can be both time consuming and frustrating, and the method of submission can also be frustrating for the recipient as it is time consuming to properly archive data contained in files received by email.

In response to the difficulties described above, it is an object of the present technology to create a system and method of submitting daily field reports (potentially from the field and in real time). It is a further object of the present technology to allow files to be uploaded directly to a website that can be later accessed by client companies who download the files needed to close out a case. The present technology can also be used to implement a system capable of storing field report forms and files for a specific company for an extended period of time, as well as organizing these files and notifying supervisors when new files are uploaded or existing files are downloaded.

BRIEF DESCRIPTION OF THE DRAWINGS

The drawings and detailed description that follow are intended to be merely illustrative and are not intended to limit the scope of protection accorded by this or any related document.

FIG. 7 shows an example of an interface for allowing a user to select a submission form.

FIG. 8 shows an interface which can be used by a field crew to submit information for a field report.

FIG. 9 shows an example of an interface for allowing a user to select a company for whom he or she would like to submit data.

FIG. 10 shows an example of an interface for allowing a user to attach components of a daily report.

FIGS. 17A-17C are several views of a single image with the uppermost portion in FIG. 17A and the lowermost portion in FIG. 17C, the image itself illustrating information which could be requested by a user in a closeout form interface.

DETAILED DESCRIPTION

For the purpose of illustration, the following description sets forth details regarding a software tool and a method that could be implemented using the inventor's technology. While this method and associated tool represent preferred embodiments of the inventor's technology, their description should be understood as being illustrative only, and should not be used to limit the scope of protection accorded by this or any related document. Other examples, features, aspects, embodiments, and advantages of the inventor's technology will become apparent to those skilled in the art, and could be implemented by such individuals without undue experimentation, based on the following description. Accordingly, the drawings and descriptions set forth herein should be understood as illustrative only, and should not be used to infer limitations on the protection accorded by any claims included in any patent or application that is related to, or claims the benefit of, this document.

The present technology can be used to implement a system and method of submitting data in real time, such as daily field reports, updates to reports, progress information and/or closeout documents. Such systems and methods can be used for processes spanning from a worker in a field crew submitting a report from the field using his or her mobile phone, to similar submission of closeout files, to a company receiving the report to actually obtaining the report and closeout files, to fully registering the case as completed. Implementations of the present technology can encompass both systems and methods, with systems being used to support functions carried out by, or used in, the methods. An example of a system which could be implemented using the disclosed technology comprises a website accessible via an internet connection, a database, and a worker access device (also referred to as a field worker device). In such a system, the website can serve as a main hub, both receiving information, and sending out information at various points when necessitated by a method performed using that system. Additionally, a website such as described could be implemented to handle user identification by allowing users (e.g., field workers) possess a unique username and password that would allow them to login to the website. Certain actions the worker performs while logged in, such as uploading or downloading files, can thereafter be recorded by the website.

Figure 14:
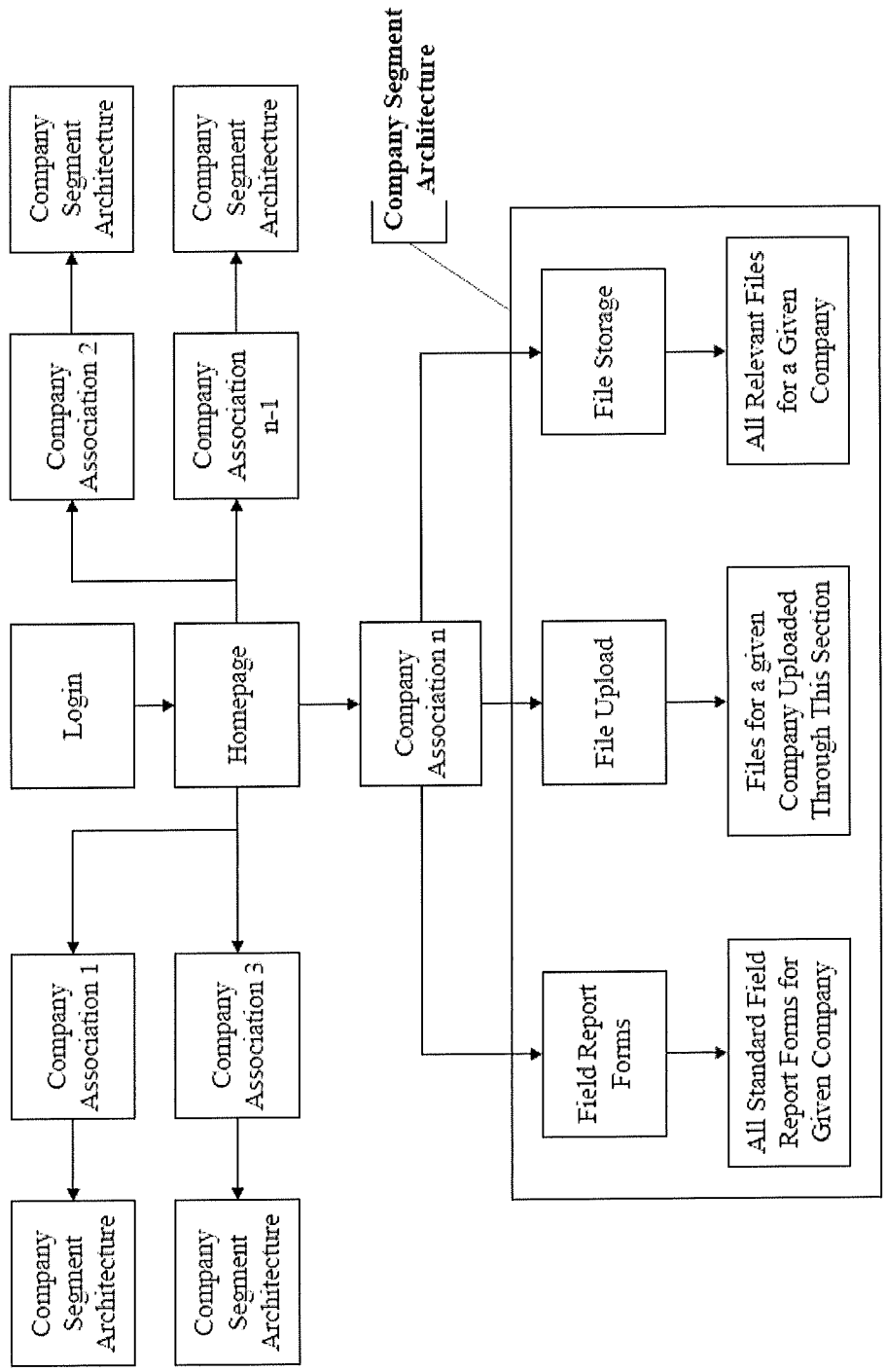
FIG. 14 shows an example of a basic architecture of a website for submitting and receiving data.

An architecture which could be used to implement a website such as described is presented in FIG. 14. In a website following that architecture, a user login and a homepage can serve as the webpage's initial entry point, with the homepage then serving as a hub allowing access to other pages of the site. As shown in FIG. 14, this type of website can be organized based upon company associations thereby facilitating the simultaneous use of the system by multiple different companies, each of which potentially may have different field report forms and file upload and storage needs. For example, as shown in FIG. 14, a website implemented according to the disclosed technology can allow each company whose workers would access the website (i.e., companies 1-n) to have its own forms for use in reporting data, own requirements for files to be uploaded, and own storage for uploaded files.

As will be apparent to one of ordinary skill in the art, a website used to implement the disclosed technology could require significant amounts of physical memory in which to store data. To address this need, a system implemented using the disclosed technology can comprise a database accessible via the website and used for storing all necessary forms, information, and files in an organized manner such that they may be retrieved by the website at any time. The exact physical manifestation of such a database may vary in from embodiment to embodiment, as there are many methods of mass physical memory storage known in the art of internet websites.

Figure 1:
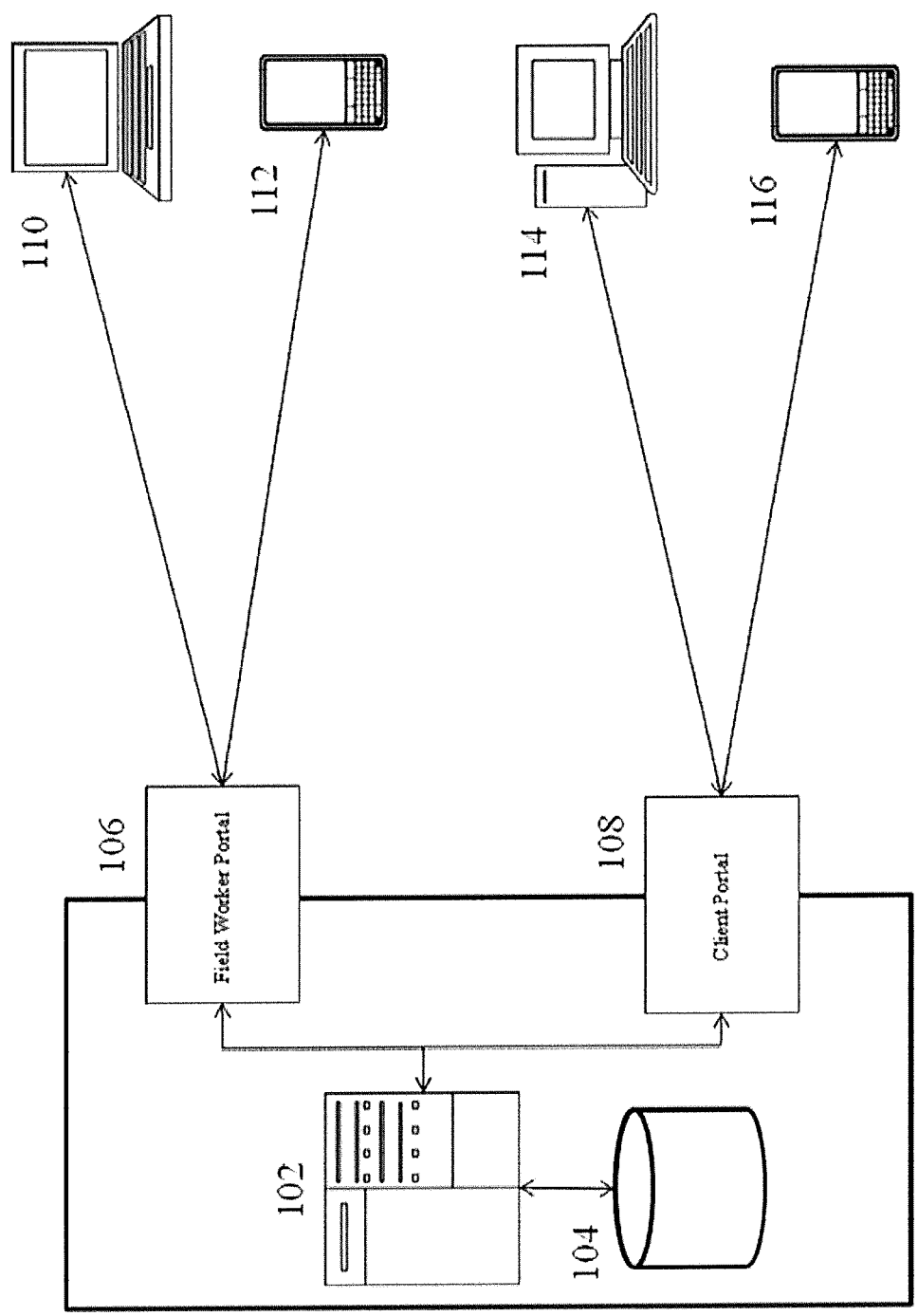
FIG. 1 illustrates an example architecture for a system configured to receive and display field reports.

Turning now to FIG. 1, that figure shows an example architecture which could be used to support a website such as described. In the architecture of FIG. 1, support for a website is provided by one or more server(s) (102) communicating with one or more database(s) (104). The server(s) (102) could be physical, virtual, or distributed, or a standard computer, or any other computing device with sufficient processing, communication and/or storage capability. The database(s) (104) could be physical or distributed database(s), cloud store, other storage type capable of reading and writing a sufficient amount of data, or combinations of those types of systems (e.g., a local physical database with cloud storage used as backup). Though the server(s) (102) and database(s) (104) are shown as distinct components in FIG. 1, it should be understood that it possible to implement the disclosed technology using servers that interact with their own integrated databases either in addition to, or as an alternative to, the interactions between separate components as illustrated in FIG. 1.

In addition to showing an architecture for supporting a website implemented using the disclosed technology, FIG. 1 also illustrates a particular approach which could be used for organizing such a website, that is, one which includes distinct field worker (106) and client (108) portals. In this approach, the field worker portal (106) could be used by a field to identify a company to whom the field worker was required to submit information, to access that company's information submission forms, and to submit the information required by those forms so that it could be organized and made accessible to the client company from a central location (e.g., the database (104)). The client portal (108), in turn, could be used by a company on whose behalf work was performed to search through information submitted via the field worker portal (106) (e.g., requesting reports or other data associated with a particular site, requesting particular types of reports or data, or requesting reports associated with particular field workers), to access that information (e.g., by requesting that the server (102) retrieve it from the database (104)), and to export that information in an easily manageable format (e.g., exporting reports in an Excel spreadsheet with rows representing individual reports, columns representing types of data to be included in those reports, and cells storing the actual information included in those reports when they were submitted by a field worker).

In addition to illustrating portions a website could be organized into, and components which could be used to support such a site, FIG. 1 also illustrates devices which could be used to access a website implemented using the disclosed technology. For example, as shown in FIG. 1, devices used to access a website of the type described will preferably include a worker access device (e.g., a laptop (110) or mobile device (112)). These worker access devices can be used to allow workers to navigate to the website via an internet connection. Since the disclosed technology will preferably be implemented to use a website as the primary medium of information exchange, nearly any modern computing device possessing an internet connection and the capability to view websites can be utilized as the worker access device. In most cases, the worker access device will likely take the form of a mobile computing device, as the present technology is designed to handle field reports pertaining to field work that is not performed in an office setting (e.g., by allowing workers on field crews to submit all necessary reports from the field through their mobile phones). FIG. 1 also shows devices, such as a client company desktop computer (114) and a client company mobile device (116) which could be used to access the client portal (108). Preferably, a system implementing the disclosed technology will use a website as the primary channel of information exchange, in which case the client company devices could, like the worker access devices, be implemented as virtually modern computing device with an internet connection and the capacity to view websites. However, the client company devices are more likely to be implemented as fixed computing devices (e.g., the desktop computer (114)), as client company personnel would be more likely to view information from a fixed location such as an office, rather than from the field.

Of course, it should be understood that, while FIG. 1 illustrates an architecture which can be used to support a website, and an approach to organizing such a website, that figure is intended to be illustrative only, and should not be treated as implying limits on how the disclosed technology could be implemented. For example, in implementations with a discrete field worker portal (106), such a portal could, either in additional to or as an alternative to the functionality described above, include functions and information such as user login, account management, field report submission, field report review, communication with the client, image submission, regional news reports and events, industry related news reports and events, and job postings. Similarly, in implementations with a discrete client portal (108), such a portal could provide the same functionality, and/or additional functionality such as the ability to finalize or approve reports.

As another example of a potential variation, it is possible that, rather than using a website as described, the disclosed technology could be implemented to provide the functionality of the field worker portal (106), the client portal (108), or both, using a dedicated application which would run on a remote device (e.g., a mobile device (112) for a field worker, and a desktop computer (114) for a client company). It is also possible that the disclosed technology could be implemented in a manner which avoided the field worker portal (106)/client portal (108) distinction all together. A high level architecture which could be used in this type of implementation is provided in FIG. 12, in which a field worker mobile device (1201) would simply interact with a website (1202) to submit information which would be stored in a database. This could be achieved, for example, by providing a single home page with functionality relevant to field workers and client company users so that and that individual users could use whichever functionality made sense given their needs (e.g., a field worker could access information submission forms for a company on whose behalf he or she was working, while a client company could access reports corresponding to those forms representing the work done at that client company's sites). Further variations (e.g., where a field worker portal is provided by a dedicated software application while a client company portal is provided by a website, or vice versa) are also possible, and will be immediately apparent to those of ordinary skill in the art in light of this disclosure. Accordingly, the discussion above, and the accompanying figures, should be understood as being illustrative only, and should not be treated as limiting.

Turning now to methods which could be potentially be performed using the disclosed technology, as discussed below, the disclosed technology can be used by workers to quickly and easily submit, in real time, field reports and files necessary to close out a case. Additionally, methods performed using the disclosed technology can also include steps that pertain to retrieval or output of data to a client company for whom the worker is performing the case. The case may comprise anything from telecom tower repair to road construction. Nearly any task that requires a report to be filed afterwards to prove completion and quality of completion, or that requires reports to be filed during the task to indicate intermediate stages of completion, can make use of the present technology to streamline the submission process. A method which can be performed using an implementation of the present technology which uses a website as the primary channel of communication is depicted in FIG. 13, and described in detail below.

Figure 13:
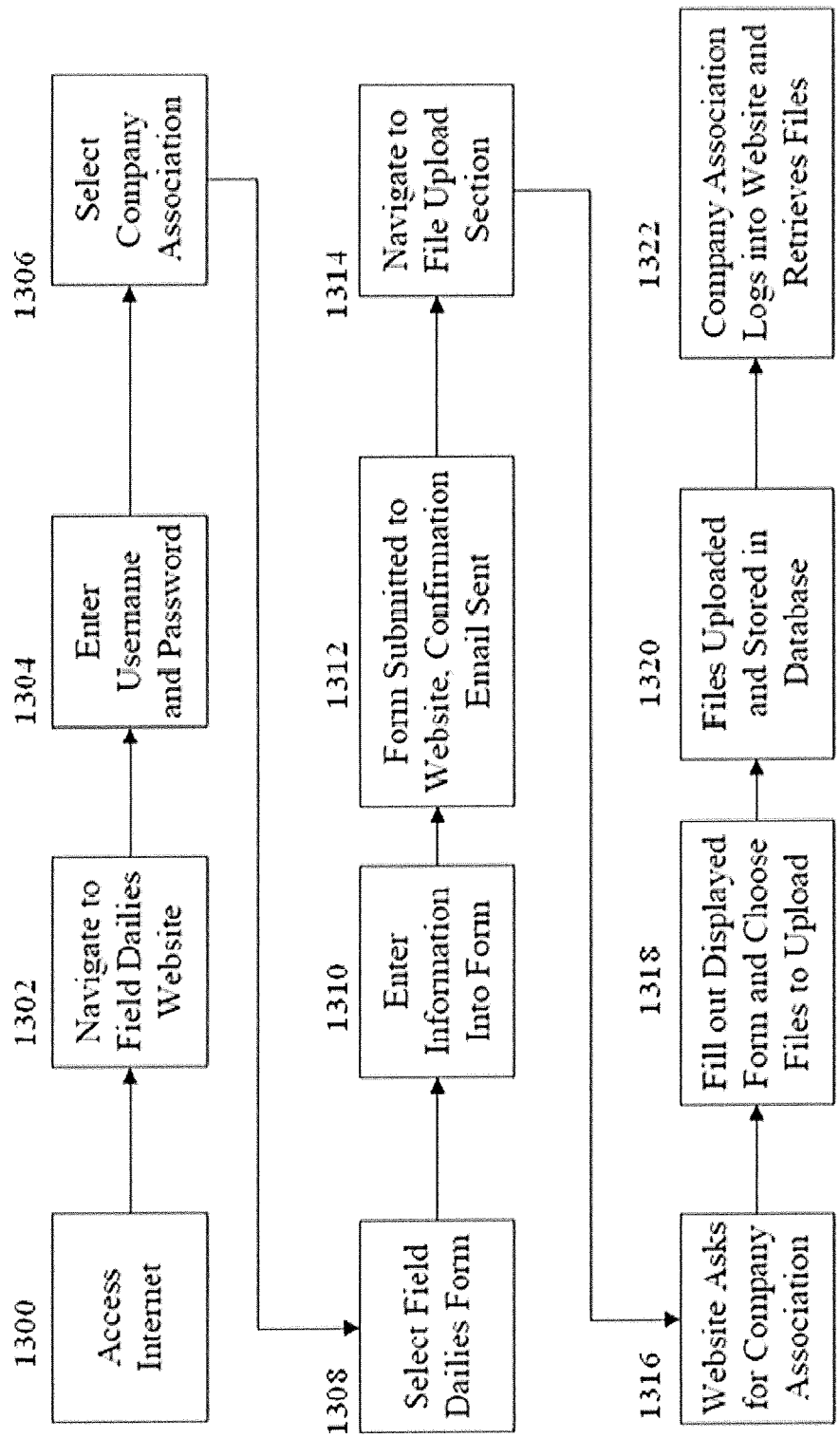
FIG. 13 illustrates a high level example of a set of steps that can be performed on a configured system to allow the submission and receipt of data.

The first step shown in FIG. 13 involve a worker accessing the internet (1300) and navigating to a website implemented using the present technology (1302) using a worker access device. As mentioned above, the worker access device may comprise nearly any computing device that possesses both an internet connection, and the capability to display websites to the worker. This affords the worker with great flexibility when submitting a field report through the present technology.

Figure 5:
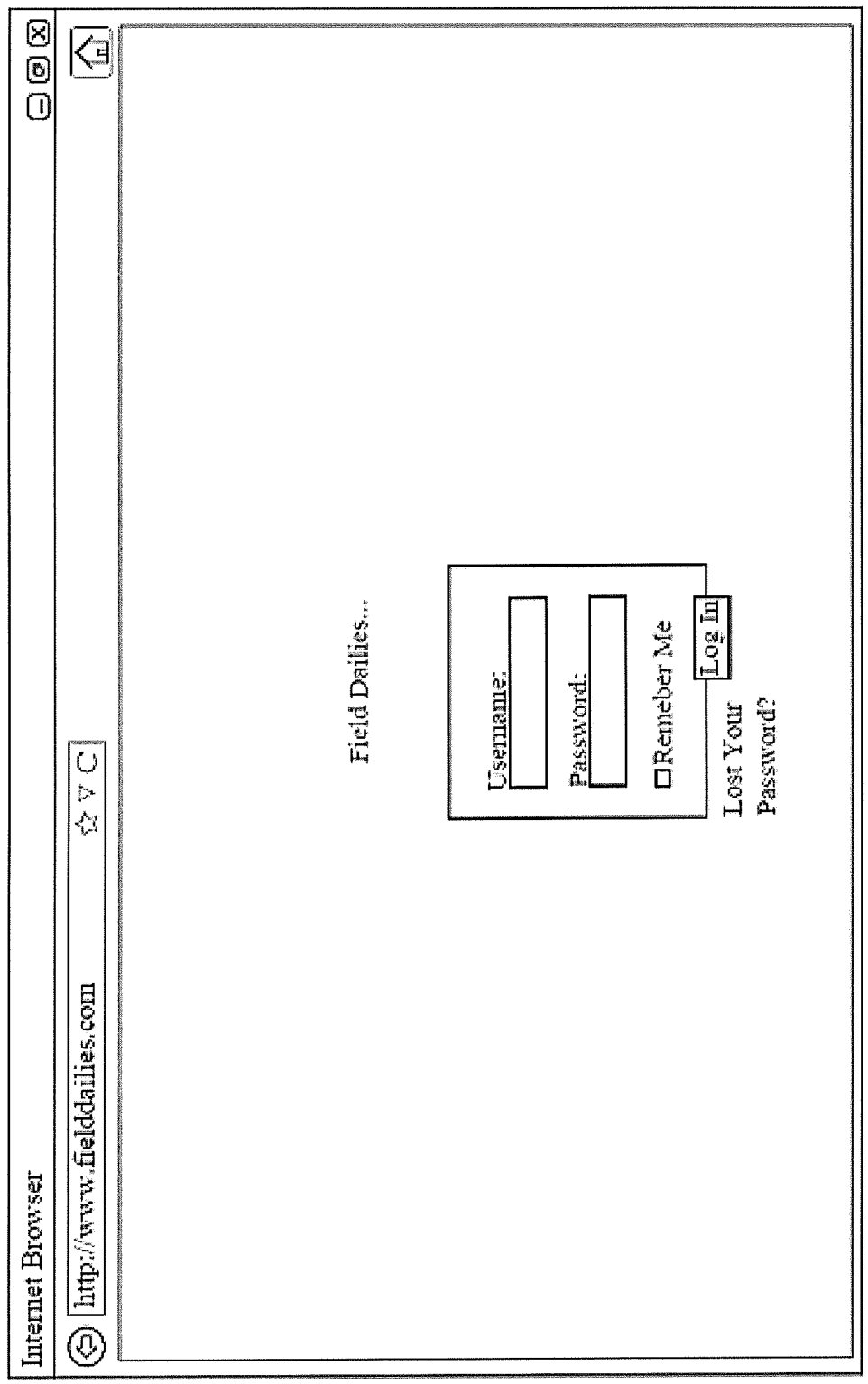
FIG. 5 shows an example of an interface for authorizing a user of a system.
Figure 16:
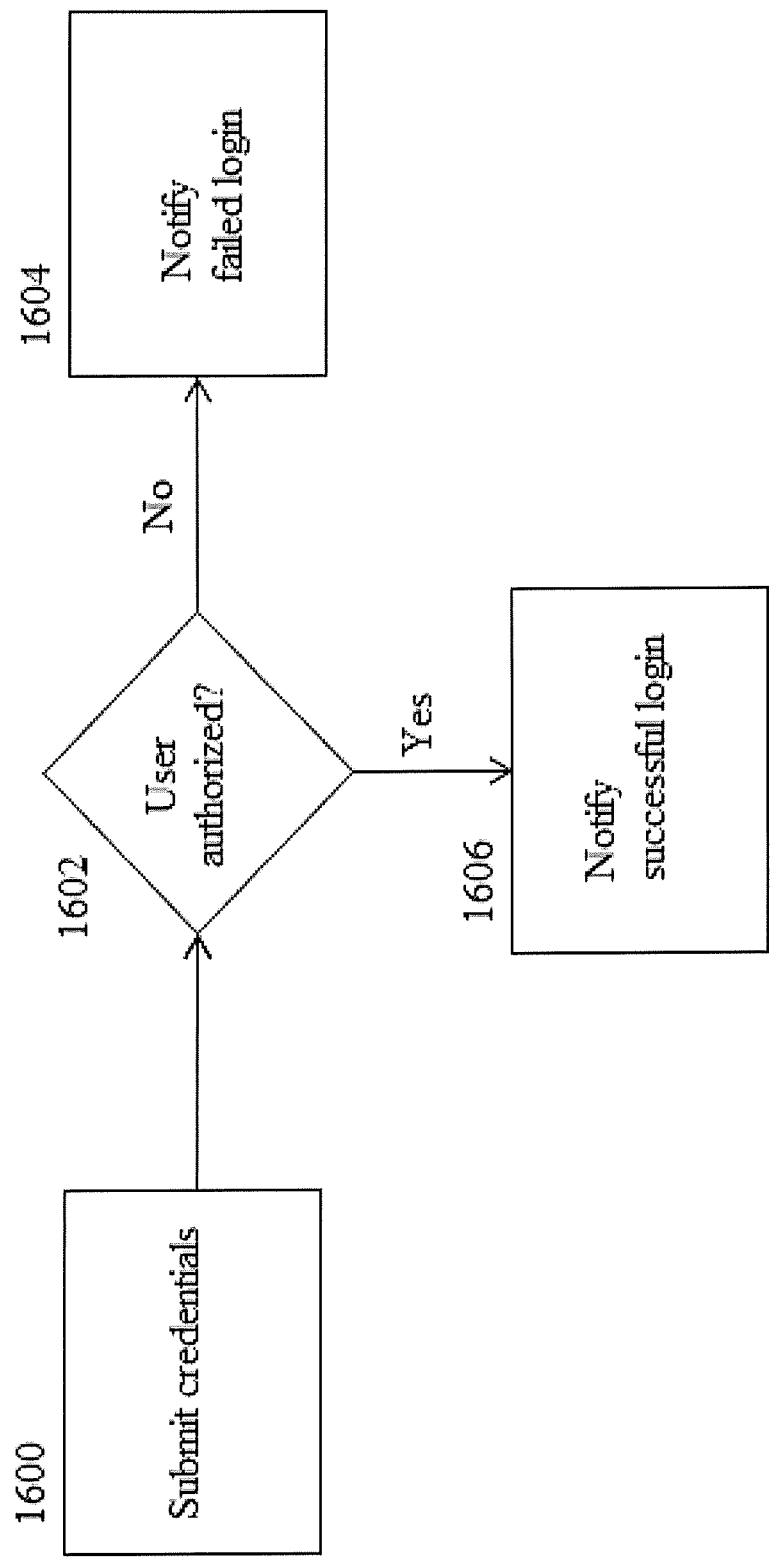
FIG. 16 shows an example of a set of steps that can be performed by a configured system to receive and authorize credentials.
Figure 17C:
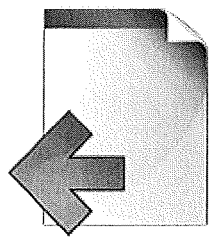

Next, the worker will be presented with an interface, such as a login access screen of the type shown in FIG. 5, which he or she can use to establish that he or she is a valid and authorized user of the present technology. This can be done by the worker entering a username and password (1304), which both identify the worker as a valid and authorized user of the system, and allow the website and/or other components of the system to track the worker's actions. FIG. 16 shows an example of a method for authorizing user credentials such as a username and password of the type which could be entered via an interface such as shown in FIG. 5. In this method, the user submits credentials (1600) to the system, which verifies (1602) that the submitted credentials belong to a valid user. If the system cannot authorize the user (1602), such as when a username or password is mistyped, the user can be notified of the failure (1604). If the system is able to authorize the user (1602) the user is notified of a successful login (1606) and granted access to the website. Submitted credentials (1600) could include a basic password and username, but could also include extra verification such as pairing a username with a specific series of media access control ("MAC") addresses or requiring a virtual private network ("VPN") connection from the field worker device.

Figure 6:
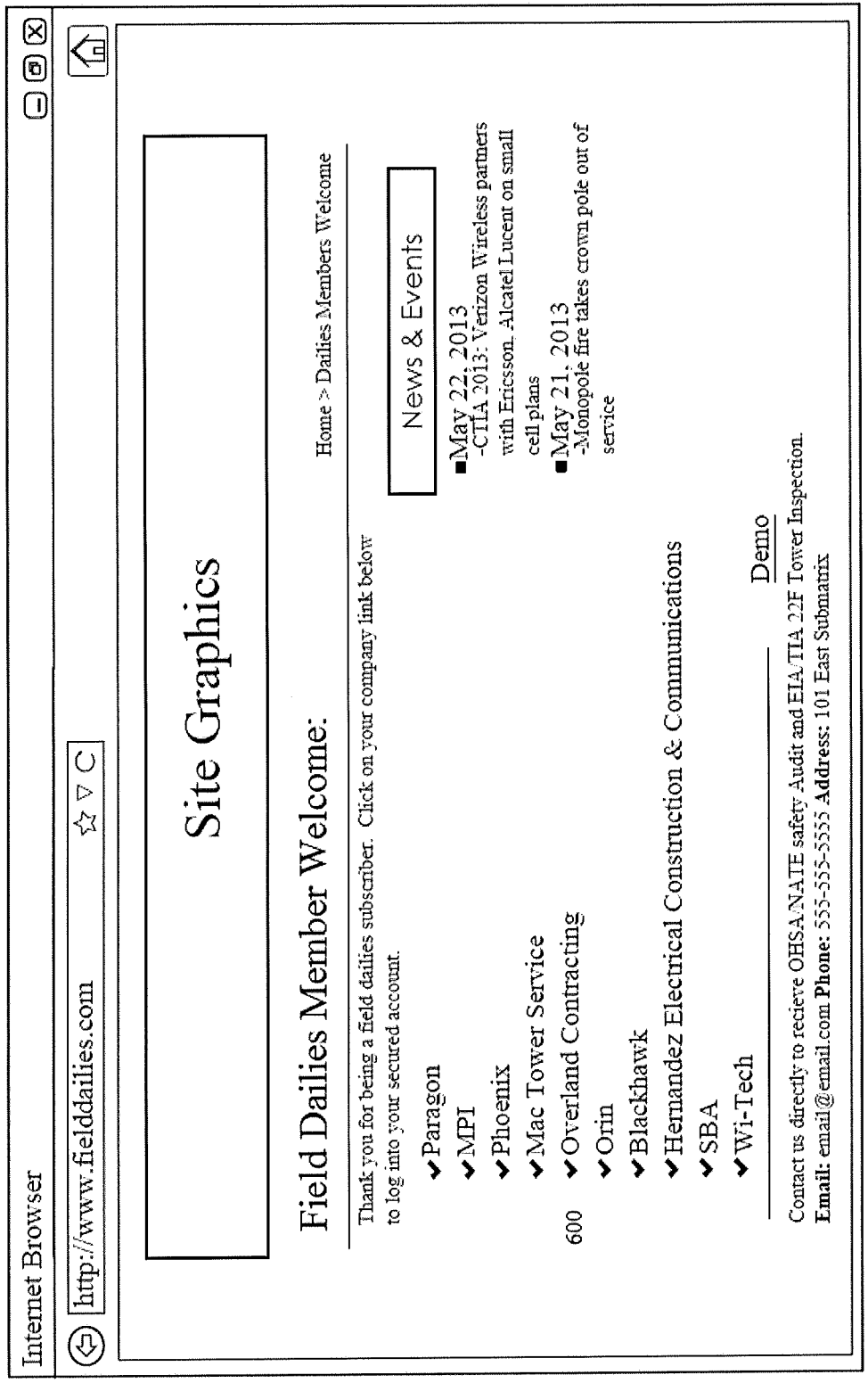
FIG. 6 shows an example of an interface for allowing a user to select a company association.

Returning now to the discussion of FIG. 13, the login process is completed in step four when the worker selects the client company with which they are associated for their current case (1306). The worker can identify the company with which they are associated in order to ensure that all forms and files they submit are received by the right company, and that those forms and files are appropriate for that company's needs. A visual representation of an example screen which could be presented to a worker in this step can be seen in FIG. 6. Each authorized field worker's credentials can be linked by, for example, database association with one or more companies that they provide services for. When selecting a company association (1306), a field worker could be presented with a list (600) of companies with which their credentials are associated, and could then select a company from that list.

In step five, the worker navigates to a specific page of the website that contains a list of all field dailies for their associated company, then selects which form (e.g., for a daily field report) they wish to complete (1308). An example of an interface which could be used in making such a selection is provided in FIG. 7. When the worker selects which form they would like to complete, the website brings up the form as well as a number of text boxes into which the worker can enter text. An example of how this may appear can be seen in FIG. 8. Each company can have one or more unique submission forms comprising various tools/fields (e.g., text fields, drop down menus, radio buttons, file upload tools, checkboxes, etc) which can accept data from a user. In this manner, a company can have unique submission forms that accept and/or prompt the user for all of the data needed for a particular report, rather than relying on a generic submission form or an arbitrary format devised by a particular field worker. In some implementations of the disclosed technology, these tools can be presented in a static manner, in which all tools are displayed to the user and he or she would fill them in as desired, or in a dynamic manner, in which a user's actions in providing data could trigger the presentation of other tools for gathering related information.

In step six, the worker will complete the form by filling in all the required information (1310), which will generally pertain to the workers who performed a task and/or the task performed. The specific information required for a particular form could be defined by the relevant client company as part of enrolling in a service provided with the disclosed technology, and can be retrieved from a database and used to generate an input form interface at the time of the user's selection. After the form has been completed, it can be submitted to the website (1312) and a confirmation message, including copy of the submitted form, can be sent to the worker (e.g., via an email account). A diagram depicting information flows for this, in which a field worker user would submit field report forms (e.g., textual information entered into text boxes reflecting work done) and files (e.g., pictures showing work done on a particular case), and receive an email confirmation back on his or her mobile device is provided in FIG. 15.

Preferably, in an implementation of the disclosed technology which includes this type of email confirmation, a worker will be given the ability to choose the email account to ensure that he or she is able to keep track of forms he or she has submitted and cases that he or she has completed. Additionally, at the time the confirmation email is sent, the submitted forms will preferably also be stored in the database for later access and use. Such access and use could include the associated client company logging into the website and retrieving a submitted form for its own record and/or outputting it in a format such as a spreadsheet. In implementations where it is present, this last feature can allow for the capture/submission of remote data and automatic exporting of that data into an excel spreadsheet, which many companies may find extremely useful as it can allow for easy organization of past cases and/or tracking of field crews and projects as they are taking place.

Continuing with the discussion of FIG. 13, in step eight of the method depicted in that figure, the worker navigates to a file upload page of the website (1314). Many field reports require certain files to be uploaded in addition to, or as part of, a submitted form. These files are often referred to as closeout files and are useful in order for the company to consider the case closed. In step nine, the website again queries the worker for what company their current case is associated with (1316). An example of an interface which can be used for this purpose is provided in FIG. 9, though it should be understood that this interface need not be different from the interface discussed previously. It should also be understood that, in some implementations, rather than re-querying the user regarding the company associated with the case being worked on, the system would simply assume that the case being worked on was associated with the company previously identified as being associated with the worker (e.g., using the interface of FIG. 6). Upon receiving the worker's answer, the website then redirects the worker to the appropriate file upload page. This ensures that the files uploaded are delivered to the correct company.

Based on the worker's company association (which could be known from the user's original login (1306) or obtained subsequently via a separate company association selection step (1316)), the worker can be presented with a form for uploading files for closing out the work done for the client company. An example of an interface which can be provided for that purpose is provided in FIG. 10, with an additional example of information which could be requested in such an interface being provided in FIGS. 17A-C. As shown in FIGS. 10 and 17A-C, such a form can include tools both for uploading files, and for directly entering information. Once the worker has been presented with the form, the method of FIG. 13 can proceed with the worker filling out the requested information and choosing what files are to be uploaded (1318). The files may be stored directly on the worker access device. This is highly useful as closeout files are often site pictures, and these pictures may be directly uploaded to the website from the worker access device in the case that the worker access device is a mobile computing device equipped with a digital camera, as is the case with nearly all modern smart phones. Of course, other types of closeout files (e.g., previously prepared reports, such as daily reports prepared during the course of work and emailed to the worker upon submission) could also be uploaded, and stored with any pictures or other included information to enable for easy retrieval at a later date by the client company. Accordingly, the discussion of picture uploads should be understood as being illustrative only, and should not be treated as being limiting on the types of files which could be uploaded in systems implemented using the disclosed technology.

Figure 11:
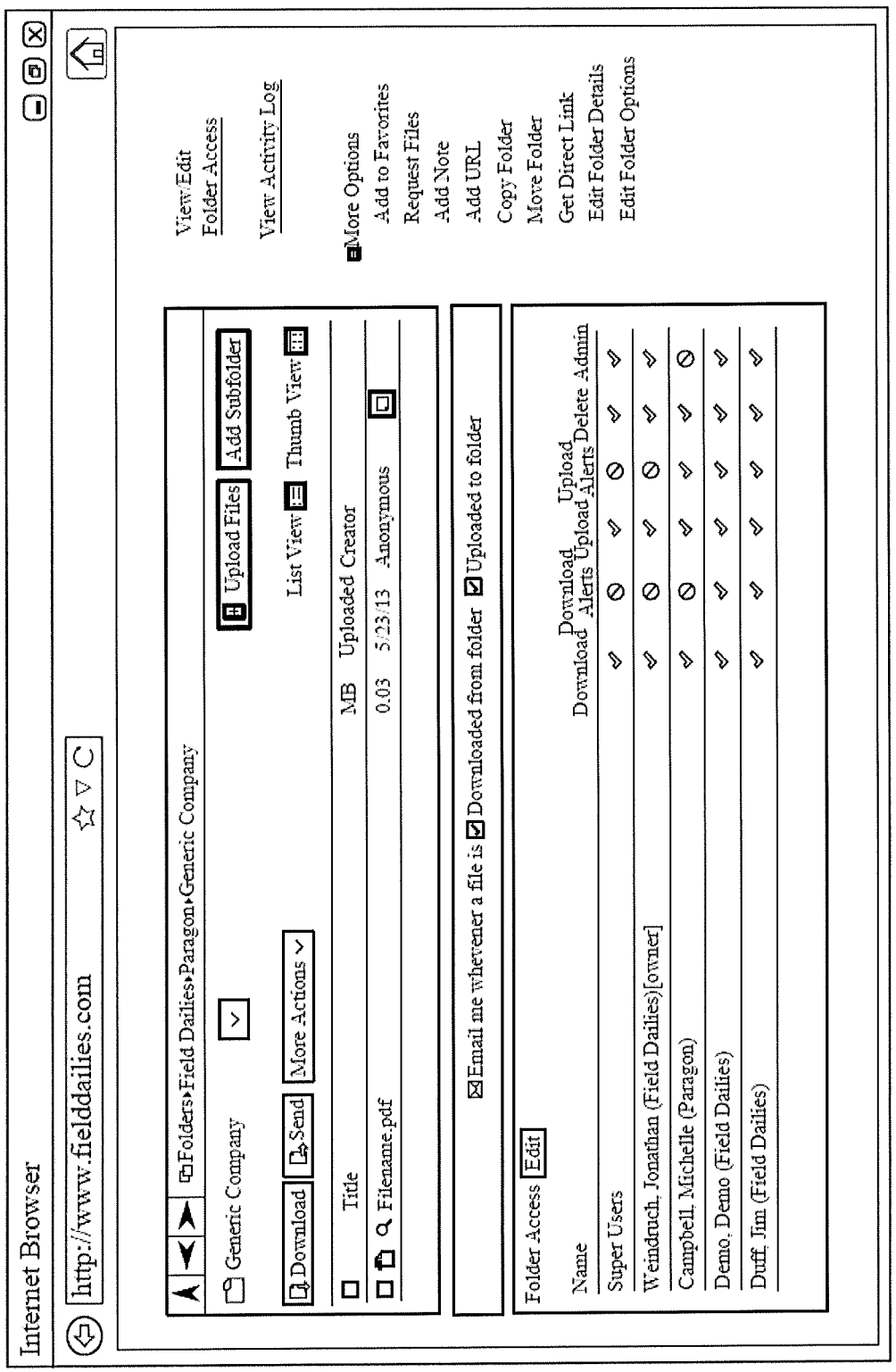
FIG. 11 shows an example of an interface for selecting a daily report to review.

In the next step in FIG. 13, step eleven, the files are uploaded to the website and then stored in the database for later use (1320). To facilitate this, the website can comprise a specialized page that displays all stored forms and files for a specific company, an example of which is provided in FIG. 11. As shown in that figure, there can be a number of different functions available for a managing user of the company to mark, organize, and control access to all of their stored files.

Finally, in step twelve, the client, who might be a managing user for the company, logs into (1322) the website and visits the file and form storage page. Through this page, the managing user is able to access and download the forms and files into his or her company's own digital storage databases in real time, immediately after they are submitted. This can enable the company to quickly and easily access the forms and files needed to consider a given case as completed and closed. Due to the real time nature of the submission of forms and files, and the speed at which they become available to a managing user for a company, this technology can be useful in gathering detailed progress information on the status of a particular job (e.g., if a managing user wants an update on the status of a particular job, he or she can request it from the field crew, which can then use the disclosed technology to provide an updated report or detailed progress information to the managing user in real time). The present technology may also continue to store the forms and files on the database, thereby serving as a backup for the company. Once all files and forms are downloaded and archived into the company's databases, the given case is considered to be completed, and closed, thereby concluding the process for the given case.

Of course, it should be understood that, as was the case with FIG. 1 and its associated discussion, FIG. 13 and the above discussion of the method depicted in that figure are intended to be illustrative only, and other methods using the disclosed technology will be immediately apparent to, and could be practiced without undue experimentation by, those of ordinary skill in the art. For example, based on the disclosure set forth herein, it is possible that one of ordinary skill in the art could use the disclosed technology to support a method which included additional steps beyond those set forth in FIG. 13. For instance, after a client company has logged in and retrieved files (1322), he or she can review the retrieved files to satisfy himself or herself that the submitted report is correct and that the requested maintenance (e.g., maintenance on LTE, UMTS, GSM, iDEN, CDMA, DAS, microwave, Two-Way, WIMAX, WIFI, VoLTE, and/or broadband infrastructure or components), inspection or other work was performed properly. The client company can then finalize the report by using the website to notify the field worker that the report is accepted as complete. This could, in some instances, cause the system to perform functions to facilitate payment for the relevant work such as generating and delivering invoices to the client, or triggering a client's internal billing notifications to authorize payment.

It is also possible that additional steps could be incorporated between those depicted in FIG. 13, rather than being performed after the end of that figure's method as described above. For example, between submission of a daily report form (1312) and navigating to an upload page to submit closeout files (1314), it is possible that there could be additional steps of notifying a client company of the uploaded daily report, and allowing the client company to review that report in a similar manner to that described above for the final closeout materials. This could be particularly beneficial in cases where the disclosed technology is used to track work completion percentages, discussed in more detail below.

There are a variety of ways in which the disclosed technology can be implemented to track work completion percentages. For example, field workers could submit daily field reports over multiple days, with each field report requesting that the worker provide an estimated work completion percent. Alternatively, field report forms could request that a worker provide information from which a completion percentage could be calculated, rather than asking the worker to provide the percentage completion estimate directly. For instance, a completion percentage could be calculated based on comparing the number of parts installed and removed or other procedures performed on a given job against the total tasks to be performed for the job to be complete. Similarly, a completion percentage could be calculated based on comparing the number of hours worked on a job against the number of hours expected for the job to be complete. Combinations are also possible. For example, if, after working for 75% of the total number of hours the job was expected to take a field crew had completed 75% of the total number of tasks included in the job, but the tasks completed were expected to only account for 50% of the total number of hours, the system could use that expected hours per task data, along with the required tasks per job data, and estimate that the project was only 50% complete (and was expected to have a 50% time overrun), rather than estimating that it was 75% complete based on the information for cost or tasks alone.

Figure 3:
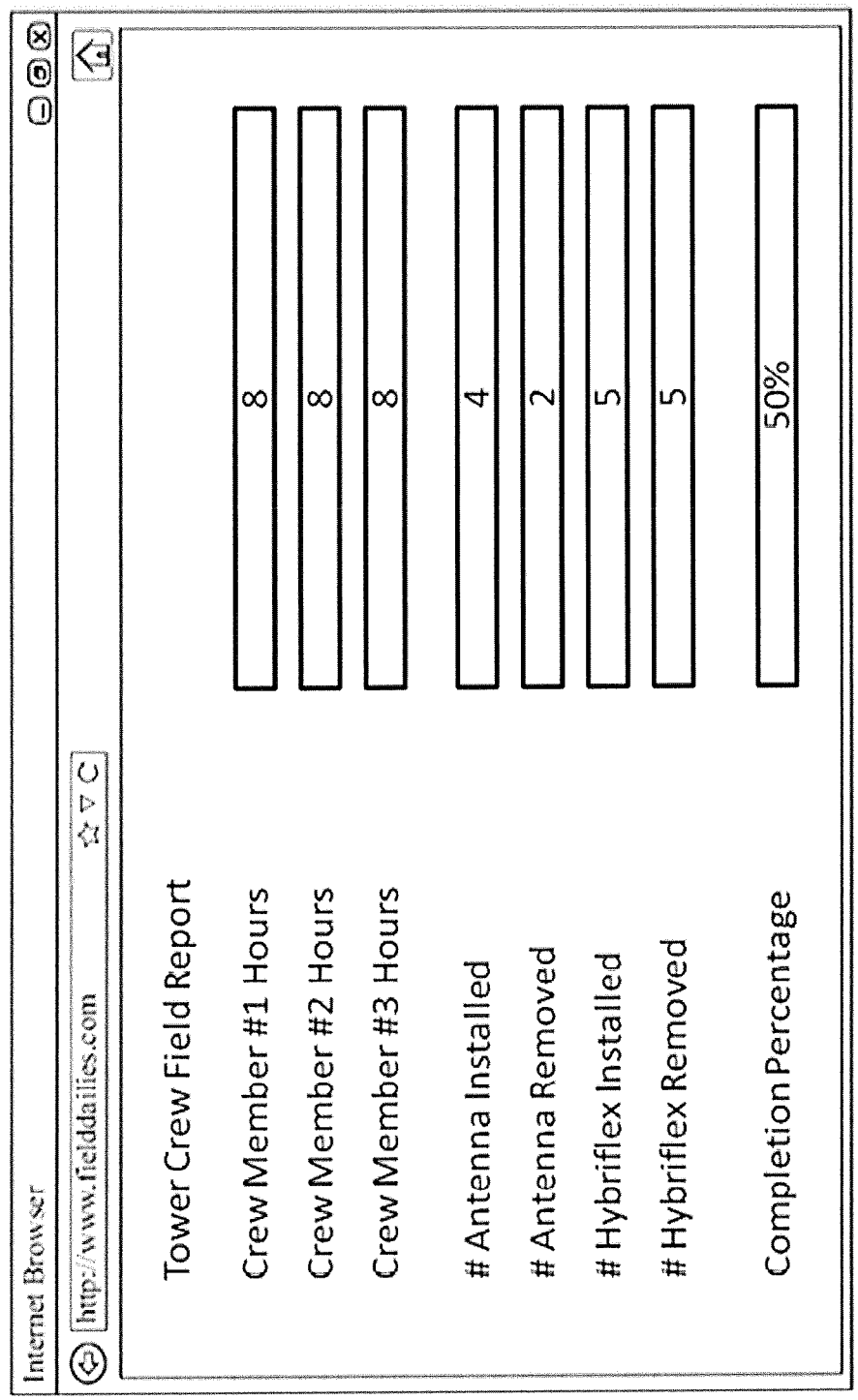
FIG. 3 shows an example of an interface which can be used to report information on work done on a job, including a work completion percent.

However determined, percentage completion information could be handled in a variety of ways. For example, it could simply be provided to the client company as part of a daily report, such as using an interface of the type shown in FIG. 3. It is also possible that the disclosed technology could be used to implement a system which would send a notification to the client company as one or more predetermined completion milestones were reached. This could be useful, for example, in cases where the client company agrees to pay a percentage of a job's overall contract value to the field worker while the job is still in progress based upon a reported completion percentage. It is also possible that completion percentage information could be used to trigger the purchases and/or deliveries of additional components or to trigger a notification that a job is nearly complete so that the next job may be assigned to the field worker that will soon be available. In addition to tracking job completion status, FIG. 3 also shows an example of an interface that can be used to submit information about materials used or installed. As this information is submitted and becomes available to a client company, it can be used to gather real time information on the status of a job as well as the associated materials usage.

Another way implementations of the disclosed technology could vary from the discussion of FIG. 13 is by varying the manner in which the steps depicted in that method are performed, instead of (or in addition to) simply adding steps to those depicted in the figure. For example, rather than simply relying on a field worker to enter information required for a daily or closeout report, some implementations of the disclosed technology could support functionality for populating some or all of that information automatically. This could be done through the use of a field worker device's global positioning system ("GPS") receiver to automatically populate fields related to location, such as state of work site, address of work site, zip code of work sites, or work site identification number. Various fields could also be populated using a device's image capture capabilities. For example, by scanning a barcode on a work order to automatically populate fields already described on that work order, or, scanning a barcode on a particular inspected component to automatically populate fields relating to that component's serial number, date of manufacture, data of installation, or other required data. Another approach to automatic data population would be to use near field communication capabilities, such as by reading a radio frequency identification tag placed at a job site, on a work order, or on an inspected component and automatically populating data identified based on that RFID tag into fields for a report.

Figure 2:
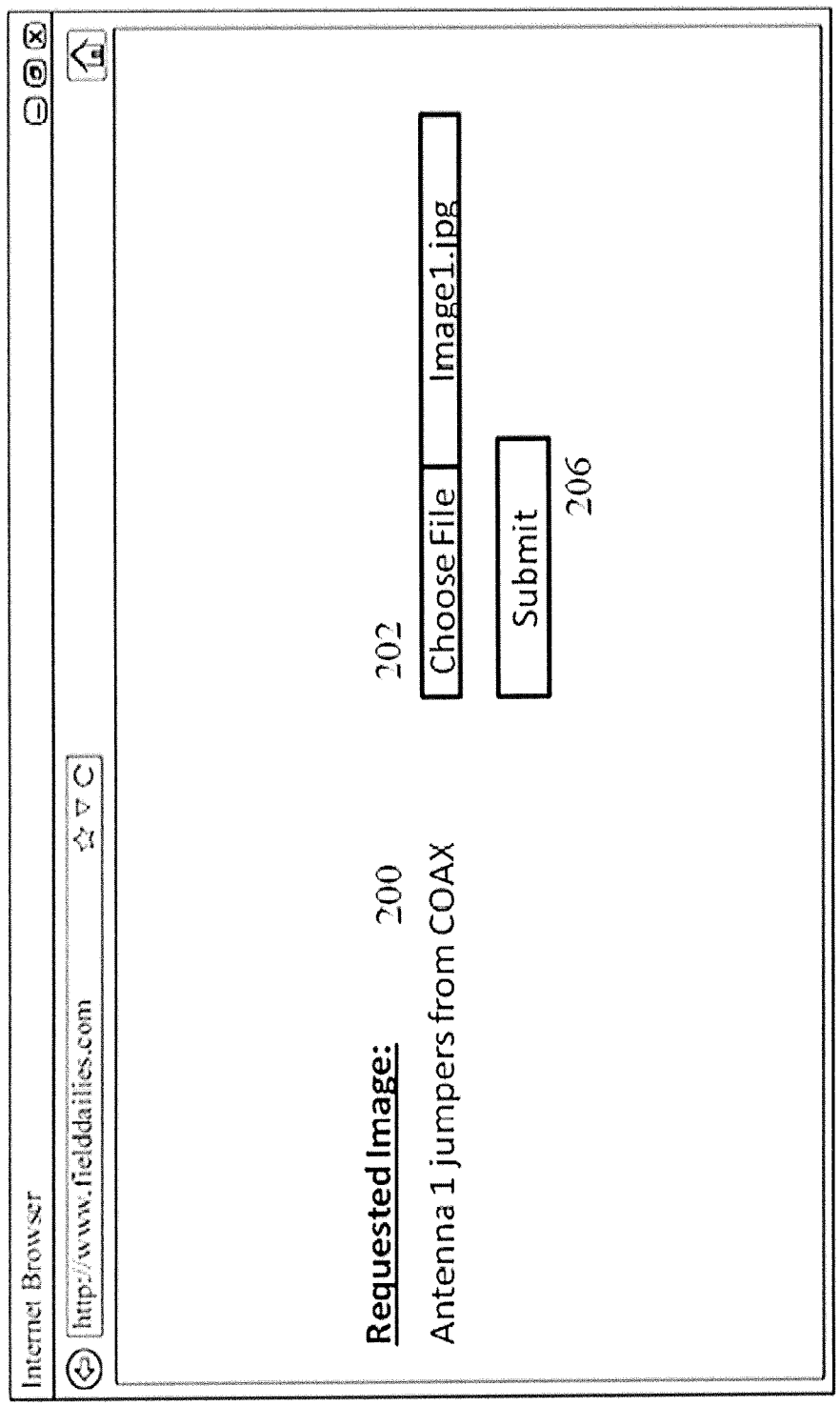
FIG. 2 shows an example of an interface that could be used to upload requested images.

Of course, providing support for automatic population of data is not the only way methods performed using the disclosed technology could vary from the discussion of FIG. 13. As an example of another type of variation, consider FIG. 2, which provides an example of a type of alternative interface which could be used for uploading picture (or other types of files needed for closing out a job). In the interface of FIG. 2, a worker would be provided with a description (200) of an image required for closing out a job. The worker could use the file selection button (202) provided for that image to trigger his or her device's native file browser. Use that browser to select the file corresponding to the description (200), then activate the submit control (206) to cause the selected file to be uploaded and stored in the database.

Figure 18:
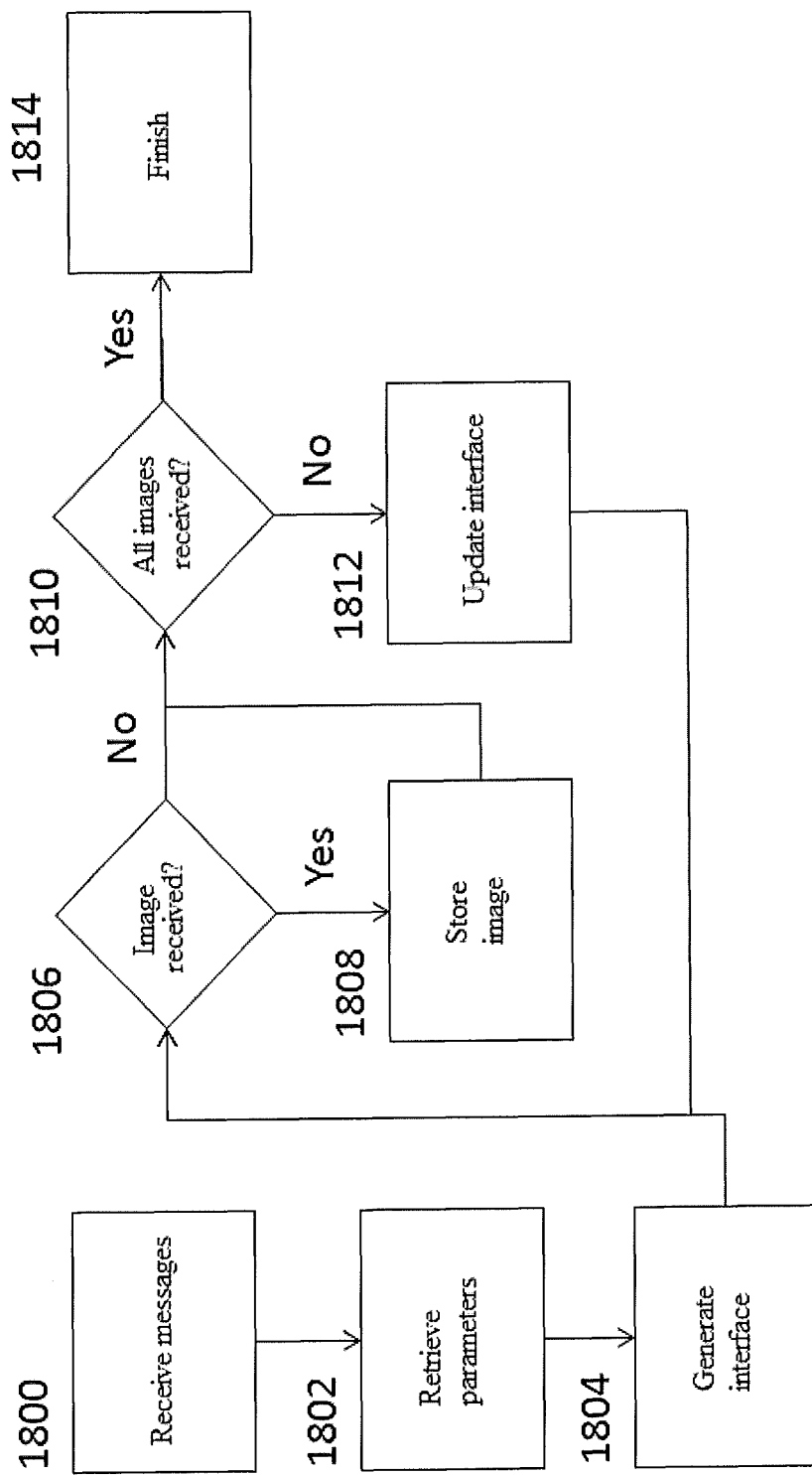
FIG. 18 shows an example of a set of steps that can be performed by a configured system to request and receive one or more images.

A more detailed illustration of how picture submission could be performed using an interface such as shown in FIG. 2 is provided in FIG. 18, which depicts a set of steps that a server could perform to facilitate the submission and management of data regarding telecommunications infrastructure work. Initially, in the method of FIG. 18, the server will receive data messages from a field worker device identifying (1800) a client company and a site where the work was performed, and requesting a picture submission interface. The server will then respond by querying a database to retrieve a set of picture submission interface parameters (1802) for the company and site identified (1800) by the data messages. The retrieved parameters can comprise an identification and a sequence for one more pictures required for closing out the field work that was performed. Alternate embodiments of this technology may retrieve a different set of parameters, such as an example or comparison image, a part number identifying a particular component which should be included in the pictures, a date indicating the last time that an image was uploaded, or other data that could be useful in providing additional functionality apparent in light of this disclosure.

Continuing with the discussion of FIG. 18, after having retrieved (1802) the picture submission interface parameters, the server can use those parameters to actually generate (1804) a customized picture submission interface using the retrieved parameters to indicate which picture should be submitted using the interface. This interface (or, more accurately, code which would cause the interface to be presented) could then be sent to the remotely located field worker device, and could be used by the field worker to upload images by causing an additional data message to be sent to the server upon activation a file upload tool included in the interface. Upon receipt of that data message by the server, the server could check (1806) if an image was included in the message, or if the file upload tool had been activated without an image being selected for upload (e.g., if a user had clicked the submit (206) button in the interface of FIG. 2 without first using the choose file (202) button).

After this check (1806), if an image had been received, it can be stored (1808) in a database for later retrieval by the client company, and the server can check (1810) if all images needed to close out the work (e.g., as indicated by the retrieved picture submission parameters) had been received. After this check (1810), which can also be performed if no image is received, if there are still images which need to be submitted, the server can update (1812) the customized picture submission interface to request that the user upload one of the outstanding image (e.g., the next image in a retrieved picture submission sequence which has not yet been received), and can repeat the above steps once a responsive data message is received from the user. Alternatively, if all images have been received, the process shown in FIG. 18 can finish (1814), such as by the server sending a message to the remote field worker device indicating that no further images are necessary, or by simply taking no action and waiting for further commands from the remote field worker device (e.g., so that the user of that device can return to a menu to perform other tasks related to closing out a job, such as submitting final timesheets and expense reports).

Other alternative approaches to uploading closeout files are also possible, and could be usefully employed in certain implementations. For example, a client company could require submission of a weekly expense report, a photo of the left side of a first component, a photo of the right side of a second component, and a photo of the underside of a third component. To facilitate this type of interaction, the disclosed technology could be implemented to provide an interface which would allow a field worker both to select an image to upload and to indicate which image requirement that image is satisfying (e.g. 'Left Side Component A', 'Right Side Component B'). In this manner, the field worker could submit images to the system in any order rather than being prompted to submit images in a specified sequence. It is also possible that, rather than simply identifying an image to be uploaded, the disclosed technology could be implemented to present an interface which would provide a user with an example of what the image to be uploaded could be expected to look like (e.g., using a form reference image, or using an image of the same component at the same site taken at an earlier time). An example of this type of interface is provided in FIG. 4, in which a user can preview an image before it is submitted, and compare it against an exemplar to verify that the image to be uploaded captures the information necessary for closing out the project.

Figure 4:
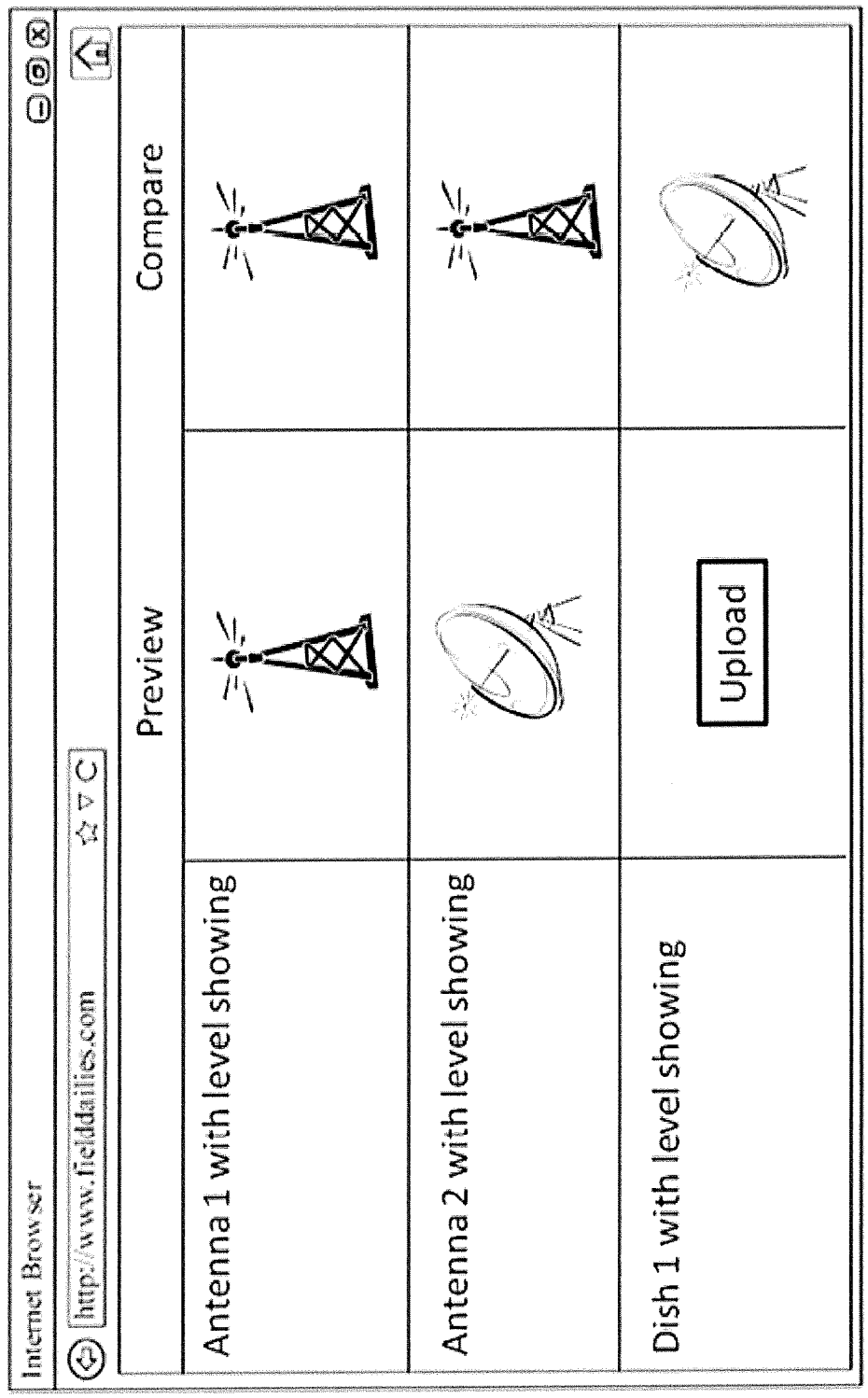
FIG. 4 shows an example of an interface which can be used to upload images.

Of course, while an interface such as shown in FIG. 4 can allow a user to identify and correct images to be submitted, it is also possible that the disclosed technology could be implemented to be able to allow for automatic detection of issues in addition to, or as an alternative to, manual verification such as described above. For example, the disclosed technology could be configured to automatically acquire location information (e.g., from a GPS receiver in a field worker device) at the time an image is captured, then send that information to the server at the time the image is uploaded, thereby allowing verification that the location where the image was captured is consistent with the location of the component(s) it purports to depict. Similarly, timestamps could be compared to verify that closeout images are created within a set period (e.g., 24 hours) of the completion of the underlying work, or an image comparison utility could be used to trigger an alert to a client company when an image of a component in a closeout report is significantly different from a previously recorded image of that same component. Other manual or automatic functionality, such as allowing the user to modify an image before it is submitted, or automatically modifying it (e.g., cropping or reshaping an image so it can fit a standard format, or modifying its resolution or encoding to meet storage requirements)

could also be included, and will be immediately apparent to those of ordinary skill in light of the description set forth above.

Of course, while the discussion above focused on uploading of predetermined images, it should be understood that the disclosed technology could also be implemented to allow upload of images which are not predetermined, and that such implementations could include functionality to allow for the upload of metadata regarding those images so that the fact that the fact that those images were not predetermined would not mean that they could not be understood. This could be useful, for example, in situations where the type of image to be captured and submitted is unknown until the field worker arrives at the site, such as where it is known that lightning damaged a component, but the specific component damaged is not yet known. Such metadata could be provided by the field worker using standard data input tools (e.g., text fields, radio buttons, selection menus, etc), or could be automatically populated in a manner similar to that described previously (e.g., location information could automatically be populated in an input form using a GPS receiver in a field worker's mobile device).

Further variations on, features for, and applications of the inventor's technology will be immediately apparent to, and could be practiced without undue experimentation by, those of ordinary skill in the art in light of this disclosure. Accordingly, the protection accorded by this document, or by any related document, should not be limited to the material explicitly disclosed herein. Rather, such protection should be understood as being defined by the claims in such document, when the terms in those claims that are identified as having definitions set forth under an "Explicit Definitions" heading are interpreted as having those definitions, and all other terms are given their broadest reasonable interpretation as set forth in a general purpose dictionary. To the extent this disclosure or the disclosure of such related document, could be treated as providing a narrower definition, the explicit definitions, or the broadest reasonable interpretation as provided in a general purpose dictionary, shall control.

Explicit Definitions

When referred to in the claims, a statement that something is "based on" something else should be understood to mean that something is determined at least in part by the thing that it is indicated as being "based on." When something is required to be completely determined by a thing, it will be described in the claim as being "based EXCLUSIVELY on" the thing.

When referred to in the claims, "calculating" should be understood to refer to the act of determining or ascertaining a thing by mathematical, formal logical, or algorithmic methods.

When referred to in the claims, "computer" should be understood to refer to a device or group of devices that is capable of performing one or more logical and/or physical operations on data to produce a result.

When referred to in the claims, "computer executable instructions" should be understood to refer to data that can be used to specify physical or logical operations that can be performed by a computer.

When referred to in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems that are located in a defined and/or circumscribed physical and/or logical space. A reference to a "computer readable medium" being "non-transitory" should be understood as being synonymous with a statement that the "computer readable medium" is "tangible", and should be understood as excluding intangible transmission media, such as a vacuum through which a transient electromagnetic carrier could be transmitted. Examples of "tangible" or "non-transitory" "computer readable media" include random access memory (RAM), read only memory (ROM), hard drives and flash drives.

When referred to in the claims, "configuring" should be understood to refer to providing the computer with specific data (which may include instructions) that can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc.).

When referred to in the claims, a "database" should be understood to refer to a collection of data stored on a computer readable medium in a manner such that the data can be retrieved by a computer. The term "database" can also be used to refer to the computer readable medium itself (e.g., a physical object that stores the data).

When referred to in the claims, "displaying" should be understood to refer to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network that causes a thing to be "displayed").

Figure 12:
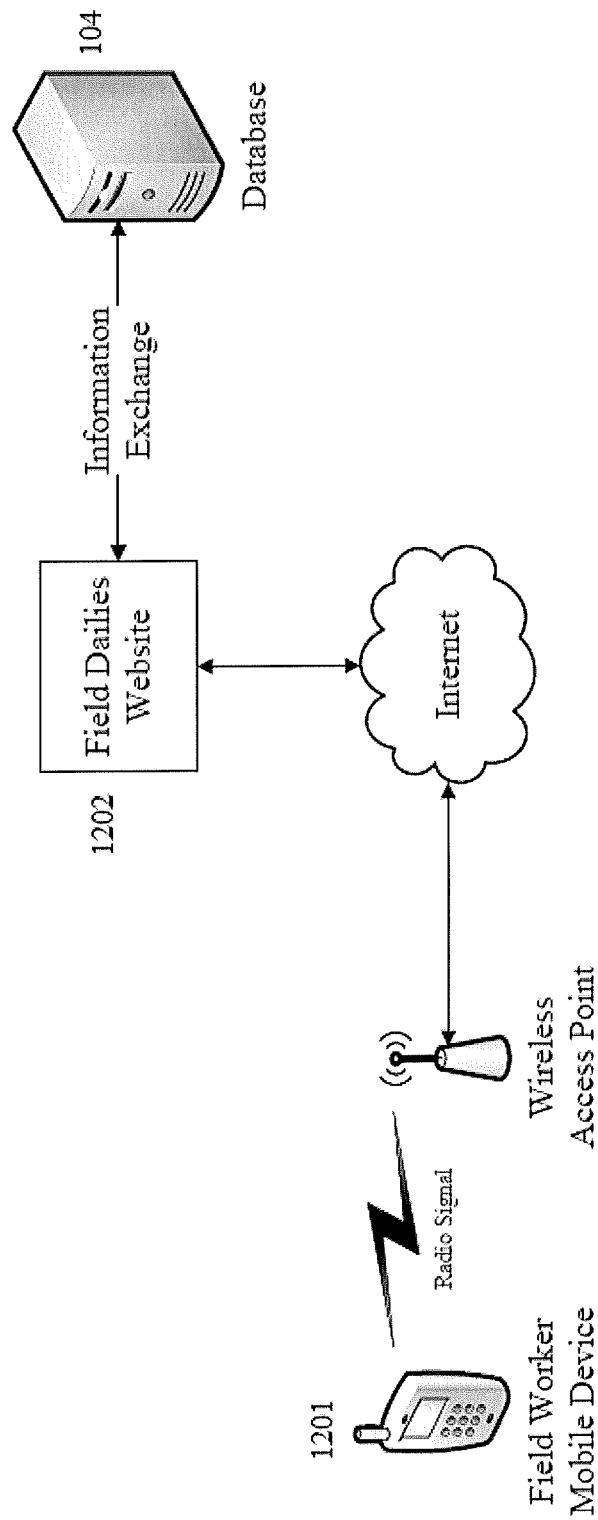
FIG. 12 illustrates an example architecture for a system configured to receive and display field reports.
Figure 15:
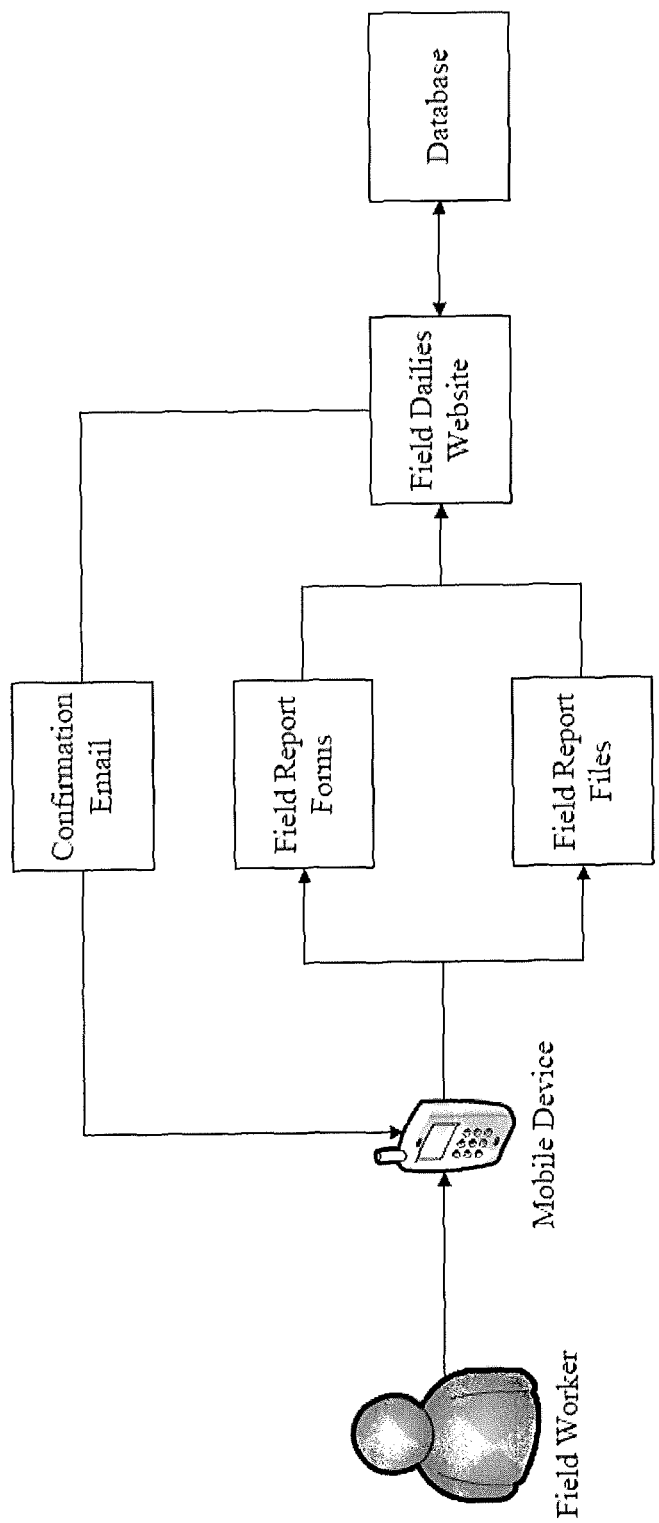
FIG. 15 shows an example of a basic set of steps that can be performed by a field worker on a configured system to allow the submission and receipt of data.

When referred to in the claims, a "means for facilitating standardized automated submission and centralization of files for closing out telecommunications infrastructure maintenance work" should be understood as a limitation set forth in the form of a means for performing a specified function as provided for in the sixth paragraph of 35 U.S.C. §112 in which the specified function is "facilitating standardized automated submission and centralization of files for closing out telecommunications infrastructure maintenance work" and the corresponding structure is a system having physical components such as the servers and databases as shown in FIGS. 1 and 12, where the servers are programmed to perform algorithms including steps of retrieving file submission interface parameters, generating an interface (examples of which are provided in FIGS. 2, 4, 10 and 17A-C) based on those parameters, sending code to a remotely located field worker device configured to cause that device to present the interface to the field worker, receiving files from the remotely located field worker device, and storing the files in a central database. These algorithms can also include additional steps, such as updating the submission interface (illustrated and discussed in the context of FIG. 18), receiving textual information submitted with the close out files (e.g., as shown in FIGS. 10 and 17A-C), and sending messages confirming receipt of the files and/or other information (as illustrated in FIG. 15).

When referred to in the claims, "progression of steps" should be understood to refer to a series of steps in which the steps are performed in a given order. It should be understood that specification of a progression of steps does not exclude a series in which additional steps are included in the progression. Thus, a progression of steps (r), (b) and (j) refers to any series in which step (b) follows step (r) and precedes step (j), even if there are intervening steps between steps (b) and (j) and/or between steps (r) and (b).

When used in the claims, "server" should be understood as a term having the same definition as given above for "computer" which his used instead of "computer" to increase the readability of the claims rather than to indicate a substantive difference.

Accordingly, I claim:

1. A method for facilitating submission and management of data regarding telecommunications infrastructure maintenance work, the method comprising the steps of:
   a) receiving, at a server, one or more data messages from a remotely located field worker device, the one or more data messages comprising:
      i) an identification of a client company;
      ii) an identification for a site at which telecommunications infrastructure maintenance work was done for the client company; and
      iii) a request for a picture submission interface;
   b) the server, in response to receiving the one or more data messages, automatically:
      i) retrieving, from a client company requirements database based on the identification of the client company, an identification of a picture required for closing out the telecommunications infrastructure maintenance work from the client company, wherein the client company requirements database stores data identifying a plurality of pictures required for closing out the telecommunications infrastructure maintenance work for the client company;
      ii) generating, at the time of receipt of the request for the picture submission interface from the remotely located field worker device, a customized picture submission interface for presentation at the remotely located field worker device, the customized picture submission interface comprising:
         A) the identification of the picture required for closing out the telecommunications infrastructure maintenance work for the client company; and
         B) a file upload tool;
      iii) configuring the remotely located field worker device to display the customized picture submission interface by sending, from the server to the remotely located field worker device, data for configuring the remotely located field worker device to have the additional functionality of displaying the customized picture submission interface, wherein the data causes the remotely located field worker device to present the customized picture submission interface to a user of the remotely located field worker device;
   c) receiving, at the server, a picture from the remotely located field worker device; and
   d) storing the picture received from the remotely located field worker device in a record in a field information database, the record in the field information database associating the received picture with:
      i) the identification of the picture required for closing out the telecommunications infrastructure maintenance work for the client company;
      ii) the site at which the telecommunications infrastructure work was done for the client company; and
      iii) the client company for whom the telecommunications infrastructure maintenance work was done;

wherein:
   A) the file upload tool comprised by the customized picture submission interface the data sent from the server to the remotely located field worker device causes the remotely located field worker device to present is one of a plurality of file upload tools comprised by that interface;
   B) the identification of the picture required for closing out the telecommunications infrastructure maintenance work for the client company comprised by the customized picture submission interface the data sent from the server to the remotely located field worker device causes the remotely located field worker device to present is one of a plurality of identifications indicating files to be uploaded using the plurality of file upload tools comprised by that interface;
   C) the customized picture submission interface the data sent from the server to the remotely located field worker device causes the remotely located field worker device to present comprises a plurality of textual information submission forms, wherein each textual information submission form from the plurality of textual information submission forms corresponds to an identification of text to be submitted using that form; and
   D) the method comprises:
      I) the server receiving, from a client company device located remotely from both the server and the remotely located field worker device, a request for a report corresponding to the customized picture submission interface;
      II) in response to the server receiving the request for the report corresponding to the customized picture submission interface, sending a set of reporting data from the server to the client company device, wherein the set of reporting data causes the client company device to perform the act of presenting a report interface comprising:
         a) the plurality of identifications indicating files to be uploaded using the plurality of file upload tools;
         b) images corresponding to each file indicated as a file to be uploaded using the plurality of file upload tools;
         c) the identifications of text to be submitted using the plurality of textual information submission forms; and
         d) text corresponding to each identification of text to be submitted using the plurality of textual information submission forms;
   E) the plurality of identifications indicating files to be uploaded using the plurality of file upload tools comprised by customized picture submission interface the data sent from the server to the remotely located field worker device causes the remotely located field worker device to present comprises identifications of a plurality of files comprising:
      I) a picture of a site identification;
      II) a picture of a site plan;
      III) a picture of an elevation plan;
      IV) a plurality of site photographs;
      V) a certificate of compliance;
      VI) a test report;
      VII) a picture of a mast structural report;
      VIII) a picture of approvals; and
      IX) a plurality of sweeps pictures;
   F) the identifications of text to be submitted using the plurality of textual information submission forms comprised by customized picture submission interface the data sent from the server to the remotely located field worker device causes the remotely located field worker device to present comprise identifications indicating textual information comprising:
  I) a site name;
  II) a BS number;
  III) a plurality of items of administrative items comprising:
    a) a type of installation;
    b) latitude;
    c) longitude;
    d) property owner;
    e) physical address;
    f) contact person or site supervisor;
    g) email;
  IV) a plurality of earth test certificate items comprising:
    a) conforms to information;
    b) required resistance;
    c) resistance achieved average;
    d) weather conditions;
    e) soil;
    f) date tested;
    g) tested by; and
    h) witnessed by; and
  V) a plurality of serial number items comprising:
    a) a region;
    b) a date received; and
    c) for each of a plurality of parts, a part number, a serial number, and a description.

2. The method of claim 1, wherein:
a) the client company requirements database stores data indicating a submission order for the pictures required for closing out the telecommunications infrastructure maintenance work for the client company;
b) the method further comprises:
  i) updating the customized picture submission interface by replacing the retrieved identification of the picture required for closing out the telecommunications infrastructure maintenance work for the client company with an identification of a picture required for closing out the telecommunications infrastructure maintenance work for the client company which comes later in the submission order from the client company requirements database;
  ii) repeatedly performing, while not all pictures required for closing out the telecommunications infrastructure maintenance work for the client company have been received, the steps of:
    A) storing a picture received from the remotely located field worker device in a record in the field information database;
    B) updating the customized picture submission interface; and
    C) sending, to the remotely located field worker device, data for configuring the remotely located field worker device to present the customized picture submission interface.

3. The method of claim 2, wherein the method comprises at least one progression of the steps of:
  i) sending, to the remotely located field worker device, data for configuring the remotely located field worker device to present the customized picture submission interface; and
  ii) updating the customized picture submission interface;
in which the step of receiving a picture from the remotely located field worker device does not take place between those steps.

4. The method of claim 1 wherein the method further comprises, after storing the picture received from the remotely located field worker device in the record in the field information database:
  a) receiving an identification of a different client company;
  b) receiving a second picture required for closing out telecommunications infrastructure maintenance work done for the different client company; and
  c) storing the second picture in a second record in the field information database, the second record associating the second picture with:
    i) an identification of the second picture retrieved from the client company requirements database based on the identification of the different client company; and
    ii) the different client company.

5. The method of claim 4, wherein a telecommunications field worker identified via previously received login information as operating the telecommunications field worker device at the time the picture is received is the same telecommunications field worker identified as operating the telecommunications field worker device at the time the second picture is received.

6. The method of claim 1, wherein the method further comprises:
  a) receiving, from a client company device remotely located from the server, a request for a closeout pictures report for the identified site;
  b) in response to receiving the request for the closeout pictures report for the identified site, generating a closeout pictures report interface, wherein the closeout pictures report interface comprises:
    i) a plurality of pictures retrieved from the field information database, wherein each picture from the plurality of pictures was stored in a record associating that picture with the identified site; and
    ii) for each picture from the plurality of pictures, an identification of that picture.

7. The method of claim 1 wherein the method further comprises, prior to receiving the request for the picture submission interface:
  a) receiving, from the remotely located field worker device, a request for a daily report submission form;
  b) retrieving, from the client company requirements database based on the identification of the client company, a set of data defining information to be submitted using the daily report submission form;
  c) sending, to the remotely located field worker device, a customized daily report submission form comprising a plurality of identifications indicating the information to be submitted using the daily report submission form;
  d) receiving, from the remotely located field worker device, the information identified as information to be submitted using the daily report submission form;
  e) storing, in the field information database, the information received from the remotely located field worker device identified as information to be submitted using the daily report submission;
  f) receiving, from a client company device located remotely from the server, a request for a report corresponding to the daily report submission form;
  g) in response to receiving the request for the report corresponding to the daily report submission form:
    i) retrieving, from the field information database, the information received from the remotely located field worker device identified as information to be submitted using the daily report interface; and ii) sending, to the client company device, data for configuring the client company device to present a report corresponding to the daily report submission form and comprising data indicating a completion percentage for the telecommunications infrastructure maintenance work at the time the information identified as information to be submitted using the daily report submission form was received from the remotely located field worker device.

8. The method of claim 1 wherein the field information database and the client company requirements database are implemented using a single physical database.

9. A system for facilitating submission and management of data regarding telecommunications infrastructure maintenance work, the system comprising:
   a) a server;
   b) one or more databases accessible via the server;
   c) a field worker device located remotely from the server; wherein:
   A) the one or more databases store data identifying pictures required for closing out telecommunications infrastructure maintenance work for one or more client companies;
   B) the server is configured to perform a set of acts comprising:
      I) sending the field worker device data for configuring the field worker device to present one or more interfaces operable by a user of the field worker device to submit one or more data messages to the server comprising:
         a) an identification of a client company;
         b) an identification for a telecommunications infrastructure maintenance site; and
         c) a request for a picture submission interface;
      II) receiving an identification of a client company from the field worker device and, based on the received identification of the client company, retrieving, from the one or more databases, an identification of a picture required for closing out telecommunications infrastructure maintenance work;
      III) generating, at the time of receipt of the request for the picture submission interface from the field worker device, a customized picture submission interface for presentation at the field worker device, the customized picture submission interface comprising:
         a) the identification of the picture required for closing out telecommunications infrastructure maintenance work; and
         b) a file upload tool;
      IV) configuring the field worker device to display the customized picture submission interface by sending, to the field worker device, picture submission interface data for configuring the field worker device to have the additional functionality of displaying the customized picture submission interface, wherein the picture submission interface data is configured to cause the field worker device to present the customized picture submission interface to the user of the field worker device;
      V) receiving a picture from the field worker device; and
      VI) storing the picture received from the field worker device in a record in the one or more databases, the record associating the received picture with:
         a) the identification of the picture required for closing out telecommunications infrastructure maintenance work;
         b) a telecommunications infrastructure maintenance site from a response received from the field worker device; and
         c) the client company from the received identification of a client company;
   C) the file upload tool comprised by the customized picture submission interface the picture submission interface data which the server is configured to configure the field worker device by sending is configured to cause the field worker device to present is one of a plurality of file upload tools comprised by that interface;
   D) the identification of the picture required for closing out telecommunications infrastructure maintenance work comprised by the customized picture submission interface the picture submission interface data which the server is configured to configure the field worker device by sending is configured to cause the field worker device to present is one of a plurality of identifications indicating files to be uploaded using the plurality of file upload tools comprised by that interface;
   E) the customized picture submission interface the picture submission interface data which the server is configured to configure the field worker device by sending is configured to cause the field worker device to present comprises a plurality of textual information submission forms, wherein each textual information submission form from the plurality of textual information submission forms corresponds to an identification of text to be submitted using that form; and
   F) the set of acts the server is configured to perform further comprises:
      I) receiving, from a client company device located remotely from both the server and the field worker device, a request for a report corresponding to the customized picture submission interface;
      II) in response to the server receiving the request for the report corresponding to the customized picture submission interface, sending a set of reporting data from the sever to the client company device, wherein the set of reporting data causes the client company device to perform the act of presenting a report interface comprising:
         a) the plurality of identifications indicating files to be uploaded using the plurality of file upload tools;
         b) images corresponding to each file indicated as a file to be uploaded using the plurality of file upload tools;
         c) the identifications of text to be submitted using the plurality of textual information submission forms; and
         d) text corresponding to each identification of text to be submitted using the plurality of textual information submission forms;
   G) the plurality of identifications indicating files to be uploaded using the plurality of file upload tools comprised by the customized picture submission interface the picture submission interface data the server is configured to configure the field worker device by sending is configured to cause the field worker device to present comprises identifications of a plurality of files comprising:
      I) a picture of a site identification;
      II) a picture of a site plan;
      III) a picture of an elevation plan;
      IV) a plurality of site photographs;
      V) a certificate of compliance;
      VI) a test report;

VII) a picture of a mast structural report;
VIII) a picture of approvals; and
IX) a plurality of sweeps pictures;
H) the identifications of text to be submitted using the plurality of textual information submission forms comprised by the customized picture submission interface the picture submission interface data the server is configured to configure the field worker device by sending is configured to cause the field worker device to present comprise identifications indicating textual information comprising:
I) a site name;
II) a BS number;
III) a plurality of items of administrative items comprising:
   a) a type of installation;
   b) latitude;
   c) longitude;
   d) property owner;
   e) physical address;
   f) contact person or site supervisor;
   g) email;
IV) a plurality of earth test certificate items comprising:
   a) conforms to information;
   b) required resistance;
   c) resistance achieved average;
   d) weather conditions;
   e) soil;
   f) date tested;
   g) tested by; and
   h) witnessed by; and
V) a plurality of serial number items comprising:
   a) a region;
   b) a date received; and
   c) for each of a plurality of parts, a part number, a serial number, and a description.

10. The system of claim 9, wherein:
a) the one or more databases store data indicating submission orders for the pictures required for closing out telecommunications infrastructure maintenance work for the one or more client companies;
b) the set of acts the server is configured to perform further comprises:
   i) updating the customized picture submission interface by replacing the retrieved identification of the picture required for closing out the telecommunications infrastructure maintenance work with an identification of a picture required for closing out the telecommunications infrastructure maintenance work for the client company which comes later in a submission order for the client company;
   ii) repeatedly performing the steps of:
      A) storing a picture received from the field worker device in a record in the one or more databases;
      B) updating the customized picture submission interface; and
      C) sending, to the field worker device, data for configuring the field worker device to present the customized picture submission interface.

11. The system of claim 10, wherein the server is configured to perform the acts of:
i) sending, to the field worker device, data for configuring the field worker device to present the customized picture submission interface; and
ii) updating the customized picture submission interface; without requiring receipt of a picture from the field worker device to take place between those acts.

12. The system of claim 9 wherein the set of acts the server is configured to perform further comprises:
a) receiving an identification of a different client company;
b) receiving a second picture required for closing out telecommunications infrastructure maintenance work done for the different client company; and
c) storing the second picture in a second record in the one or more databases, the second record associating the second picture with:
   i) an identification of the second picture; and
   ii) the different client company.

13. The system of claim 12, wherein the server is configured to be operable to receive the picture and the second picture from the same field worker device, after having received the same login credentials from that field worker device.

14. The system of claim 9, wherein:
a) the system further comprises a client company device located remotely from both the server and the field worker device;
b) the set of acts the server is configured to perform further comprises:
   i) receiving, from the client company device, a request for a closeout pictures report for the telecommunications infrastructure maintenance site;
   ii) in response to receiving the request for the closeout pictures report, generating a closeout pictures report interface, wherein the closeout pictures report interface comprises:
      A) a plurality of pictures retrieved from the one or more databases, wherein each picture from the plurality of pictures was stored in a record associating that picture with the telecommunications infrastructure maintenance site; and
      B) for each picture from the plurality of pictures, an identification of that picture.

15. The system of claim 9 wherein the set of acts the server is configured to perform further comprises:
a) receiving a request for a daily report submission form from the field worker device;
b) retrieving, based on the identification of the client company, a set of data defining information to be submitted using the daily report submission form;
c) sending, to the field worker device, a customized daily report submission form comprising a plurality of identifications indicating the information to be submitted using the daily report submission form;
d) receiving, from the remotely located field worker device, the information identified as information to be submitted using the daily report submission form;
e) storing, in the one or more databases, information identified as information to be submitted using the daily report submission;
f) receiving, from a client company device located remotely from the server, a request for a report corresponding to the daily report submission form;
g) in response to receiving the request for the report corresponding to the daily report submission form:
   i) retrieving, from the one or more databases, the received information identified as information to be submitted using the daily report interface; and
   ii) sending, to the client company device, data for configuring the client company device to present a report corresponding to the daily report submission form and comprising data indicating a completion percentage for the telecommunications infrastructure maintenance work at the time the information identified as information to be submitted using the daily report submission form was received.

16. The method of claim 1, wherein:
a) the telecommunications infrastructure maintenance work comprises one or more of:
   i) constructing new infrastructure at the site identified in the one or more data messages received at the server from the remotely located field worker device;
   ii) installation of telecommunications infrastructure parts at the site identified in the one or more data messages received at the server from the remotely located field worker device;
b) the remotely located field worker device is a mobile phone located at the site identified in the one or more data messages received at the server at the time the server receives those messages.

\* \* \* \* \*